US007299468B2

(12) United States Patent
Casey et al.

(10) Patent No.: US 7,299,468 B2
(45) Date of Patent: Nov. 20, 2007

(54) MANAGEMENT OF VIRTUAL MACHINES TO UTILIZE SHARED RESOURCES

(75) Inventors: Christine T. Casey, Endicott, NY (US); Steven S. Shultz, Endicott, NY (US); Xenia Tkatschow, Jamesville, NY (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 10/425,470

(22) Filed: Apr. 29, 2003

(65) Prior Publication Data

US 2004/0221290 A1 Nov. 4, 2004

(51) Int. Cl.
G06F 9/46 (2006.01)
G06F 9/455 (2006.01)
G06F 7/00 (2006.01)
G06F 12/00 (2006.01)

(52) U.S. Cl. .......................... 718/104; 718/1; 718/100; 707/10; 711/6

(58) Field of Classification Search ................ 718/1, 718/100–108; 711/6; 703/23; 707/10, 104.1
See application file for complete search history.

(56) References Cited

U.S. PATENT DOCUMENTS

| 4,916,608 | A | * | 4/1990 | Shultz | ........................ | 718/104 |
| 5,506,975 | A | | 4/1996 | Onodera | | |
| 5,592,625 | A | | 1/1997 | Sandberg | ............... | 395/200.08 |
| 5,692,192 | A | | 11/1997 | Sudo | .......................... | 395/675 |
| 5,884,077 | A | | 3/1999 | Suzuki | ....................... | 395/675 |
| 5,991,893 | A | | 11/1999 | Snider | | |
| 6,003,066 | A | | 12/1999 | Ryan et al. | ................. | 709/201 |
| 6,075,938 | A | | 6/2000 | Bugnion et al. | ....... | 395/500.48 |

(Continued)

FOREIGN PATENT DOCUMENTS

JP 63-036445 2/1988

(Continued)

OTHER PUBLICATIONS

Uhlig et al., "Towards Scalable Multiprocessor Virtual Machines", Proceedings of the 3RD Virtula Machine Research & Technology Symposium, CA, 2004, pp. 1-14.*

(Continued)

Primary Examiner—Meng-Al T. An
Assistant Examiner—Jennifer N. To
(74) Attorney, Agent, or Firm—Arthur J. Samodovitz

(57) ABSTRACT

A technique for utilizing resources in a virtual machine operating system. The virtual machine operating system comprises a multiplicity of virtual machines. A share of resources is allocated to each of the virtual machines. Utilization by one of the virtual machines of the resources allocated to the one virtual machine is automatically monitored. If the one virtual machine needs additional resources, the one virtual machine is automatically cloned. The clone is allocated a share of the resources taken from the shares of other of the virtual machines, such that the resultant shares allocated to the one virtual machine and the clone together are greater than the share allocated to the one virtual machine before the one virtual machine was cloned. The clone performs work with its resources that would have been performed by the one virtual machine if not for the existence of said clone.

8 Claims, 6 Drawing Sheets

U.S. PATENT DOCUMENTS

| | | | |
|---|---|---|---|
| 6,081,833 A | 6/2000 | Okamoto | 709/213 |
| 6,148,378 A | 11/2000 | Bordaz | 711/147 |
| 6,170,045 B1 | 1/2001 | Bobak et al. | 711/169 |
| 6,205,528 B1 | 3/2001 | Kingsbury | 711/170 |
| 6,389,482 B1 | 5/2002 | Bobak et al. | 709/312 |
| 6,438,663 B1 | 8/2002 | Agarwal et al. | 711/148 |
| 6,477,560 B1 | 11/2002 | Murayama et al. | 709/104 |
| 6,542,926 B2 | 4/2003 | Zalewski et al. | 709/213 |
| 6,732,220 B2 * | 5/2004 | Babaian et al. | 711/6 |
| 6,738,977 B1 | 5/2004 | Berry et al. | 395/500.48 |
| 7,089,558 B2 * | 8/2006 | Baskey et al. | 718/104 |
| 7,136,800 B1 * | 11/2006 | Vega | 703/23 |
| 7,158,972 B2 * | 1/2007 | Marsland | 707/10 |
| 2001/0047482 A1 | 11/2001 | Harris et al. | |
| 2002/0013802 A1 * | 1/2002 | Mori et al. | 709/1 |
| 2002/0016812 A1 * | 2/2002 | Uchishiba et al. | 709/104 |
| 2003/0037178 A1 | 2/2003 | Vessey et al. | 709/319 |
| 2003/0065676 A1 * | 4/2003 | Gbadegesin et al. | 707/104.1 |
| 2004/0010787 A1 * | 1/2004 | Traut et al. | 718/1 |
| 2004/0221285 A1 | 11/2004 | Donovan et al. | |
| 2004/0230972 A1 | 11/2004 | Donovan et al. | 718/1 |

FOREIGN PATENT DOCUMENTS

| | | |
|---|---|---|
| JP | 2112055 A | 4/1990 |
| JP | 07-013823 | 1/1995 |
| JP | 09-319653 | 12/1997 |
| JP | 2000-215071 | 8/2000 |
| JP | 2001142725 A | 5/2001 |
| JP | 20010216172 A | 8/2001 |
| JP | 2002-073358 | 3/2002 |
| JP | 2002-140202 | 5/2002 |
| WO | WO 00/73902 A1 | 12/2000 |

OTHER PUBLICATIONS

IBM TDB vol. 37 No. 06A Jun. 1994 "Shared Memory Cluster—A Scalable Multiprocessor Design" pp. 503-507.

IBM TDB vol. 35 No. 18 Jun. 1992 "Logically Shared Memory" pp. 44-49.

U.S. Appl. No. 10/280,987 entitled "System and Method for Transferring Data Between Virtual Machines or Other Computer Entities" filed on Oct. 24, 2002 by Shultz and Tkatschow.

Azzedin et al., "Integrating Trust Into Grid Resource Management Systems", Proceedings of the International Conference on Parallel Processing, 2002, pp. 1-8.

Back et al, "Processes in Kaffeos: Isolation, Resource Management, and Sharing in Java", Symposium on Operating Systems Design and Implementation, 4th, Sand Diego, Oct. 22-25, 2000, Proceedings of OSDI 2000; 14 pages.

Bagley et al, "Sharing Data and Services in a Virtual Machine System", IBM Reseach Laboratory; pp. 82-88.

Binder et al, "Portable Resource Control in Java", OOPSLA 01 Tampa, Florida, ACM 2001; pp. 139-155.

Cosell et al, "An Operation System for Computer Sharing", ACM; pp. 75-81.

Yau et al, "Resource Management in Software-Programmable Router Operating Systems", IEEE, 2001; pp. 489-500.

* cited by examiner

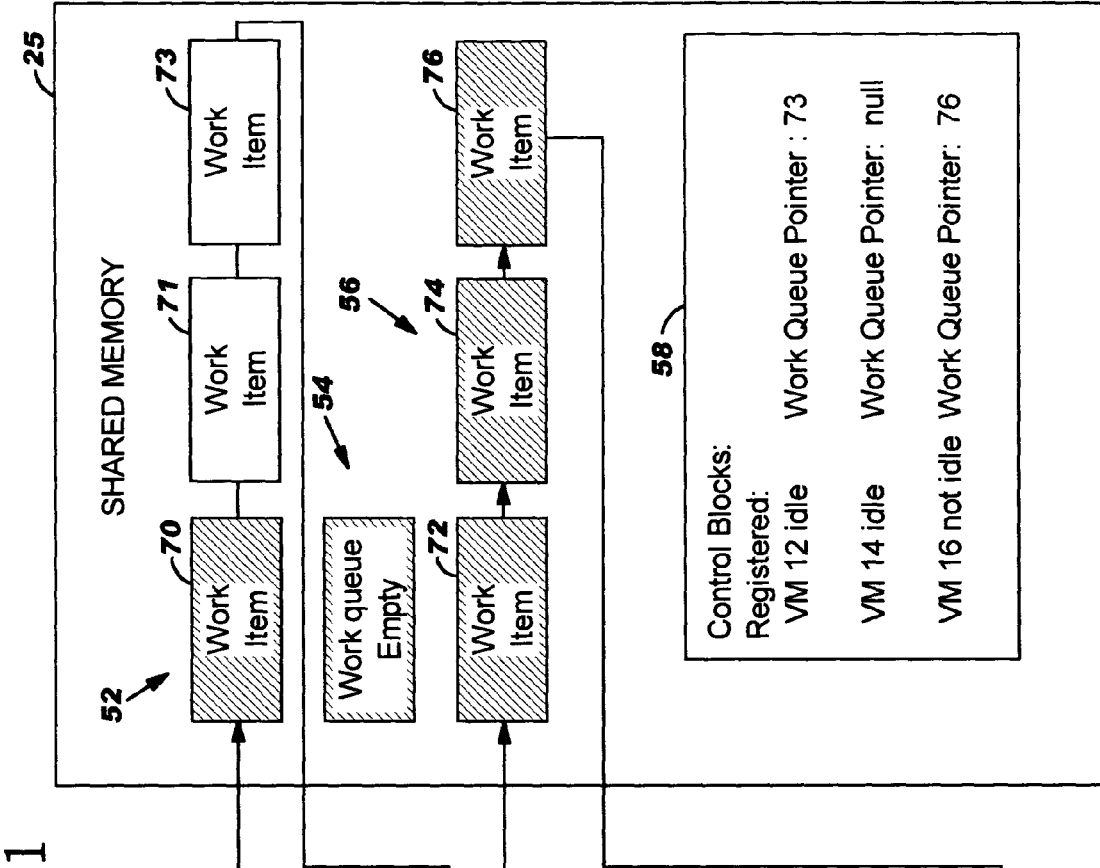
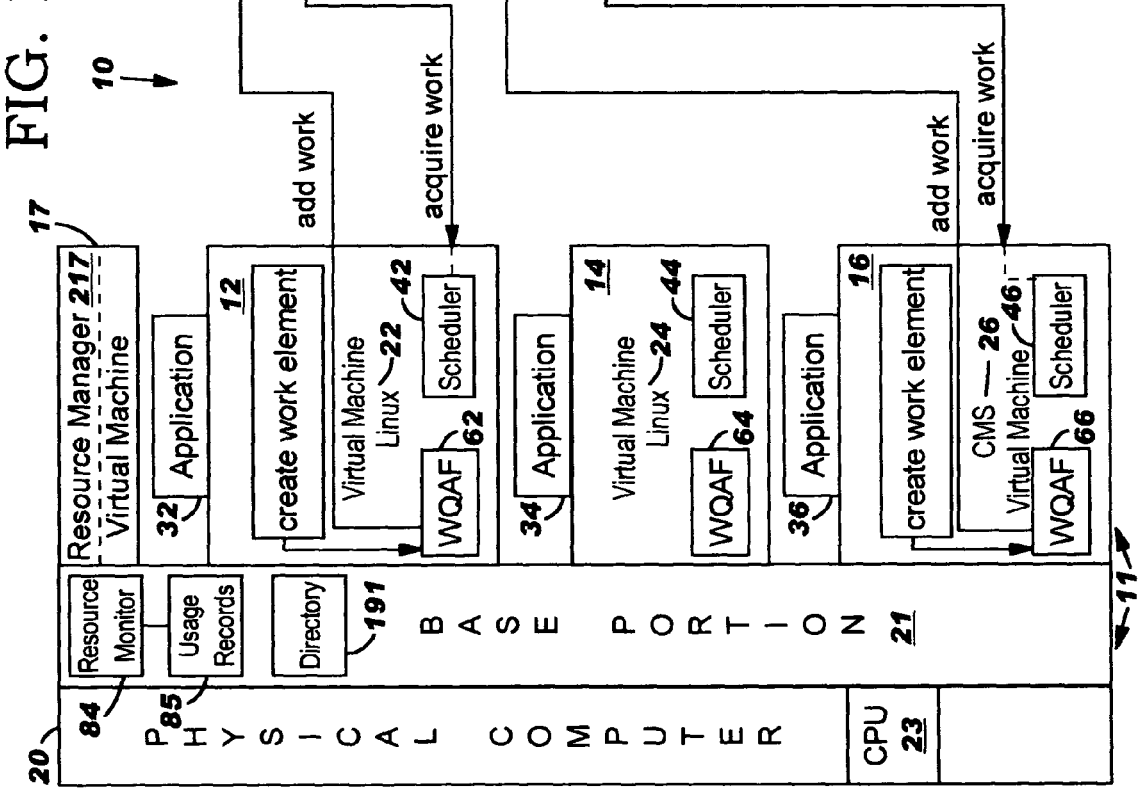
FIG. 1

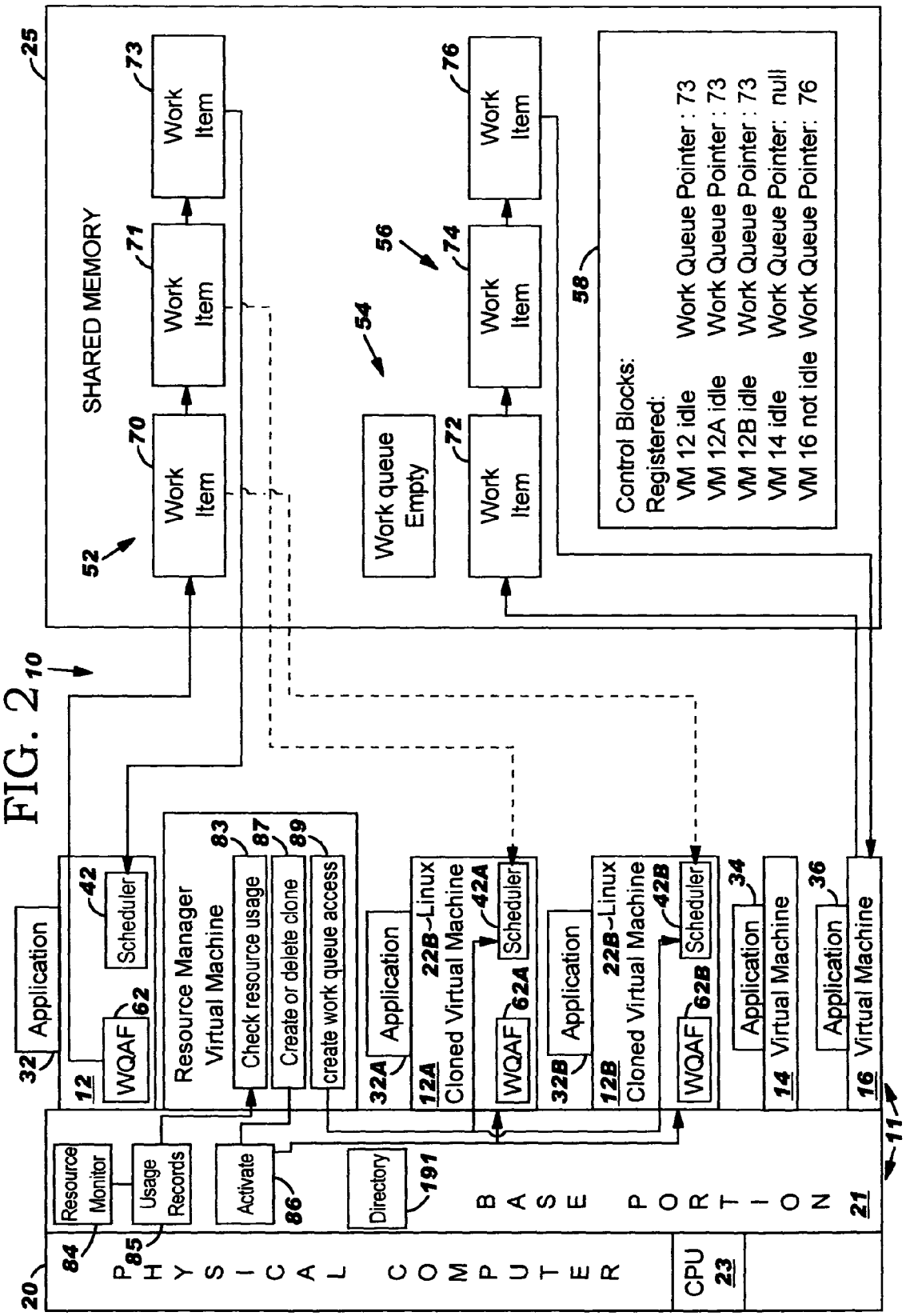

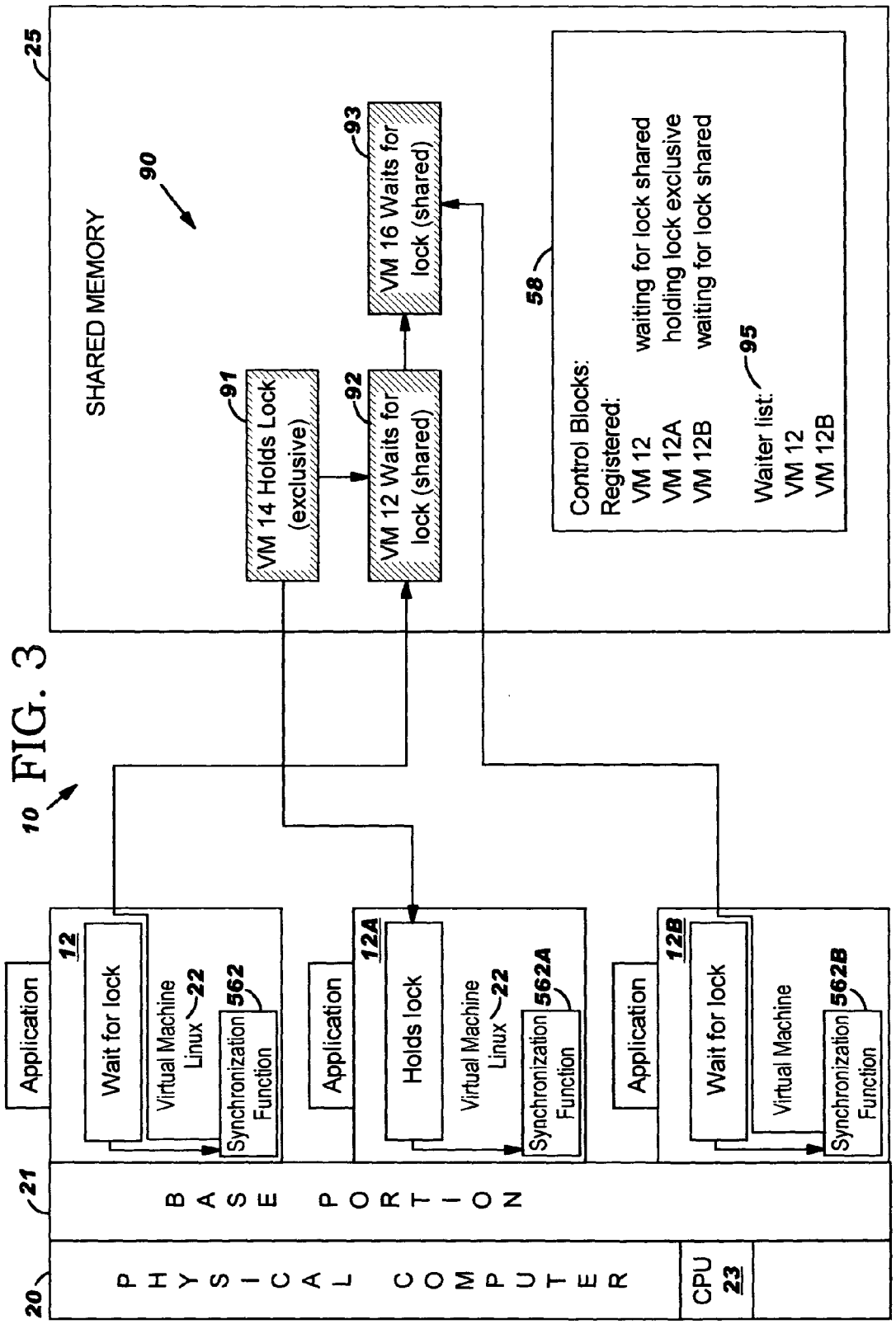

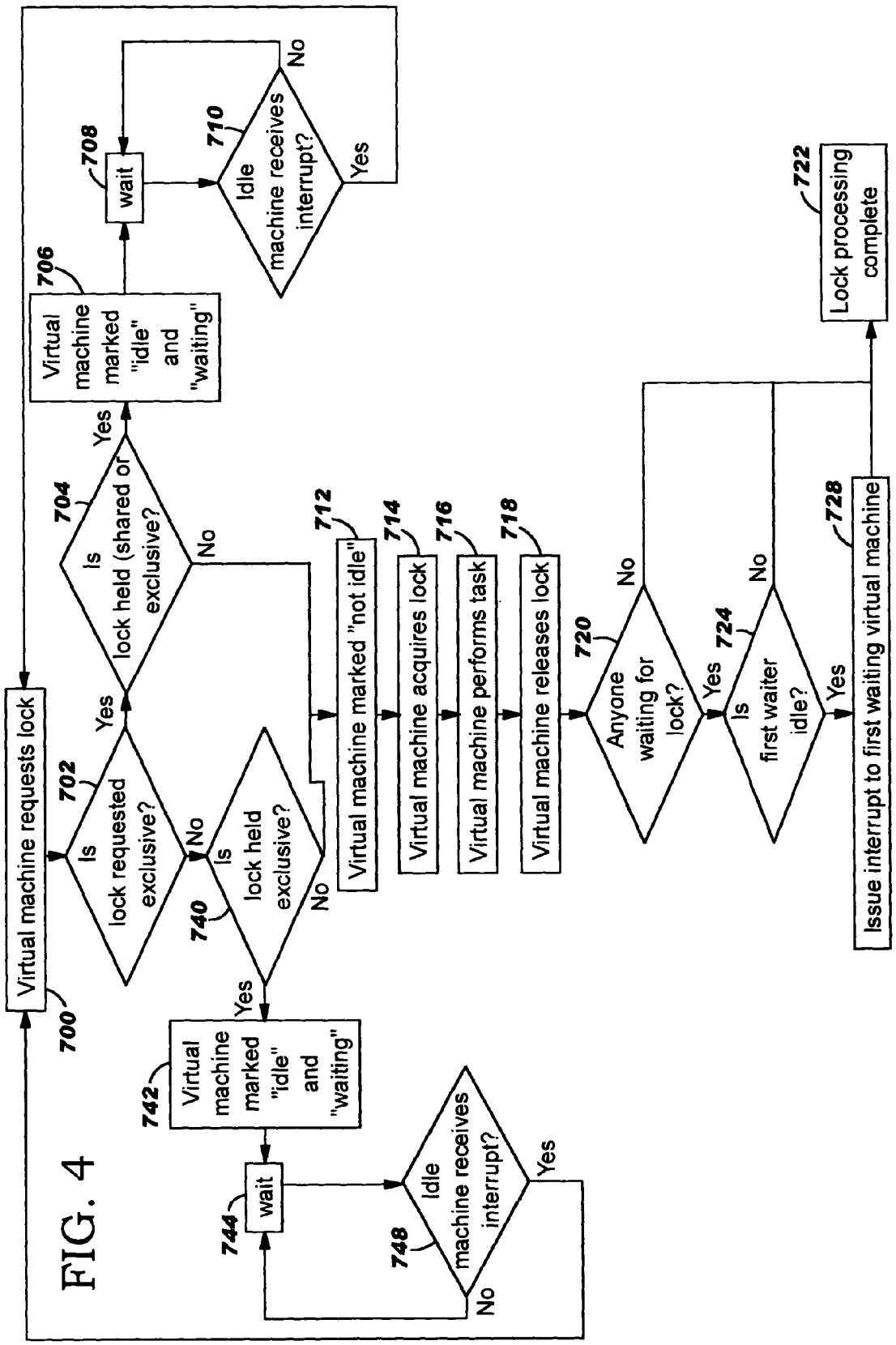

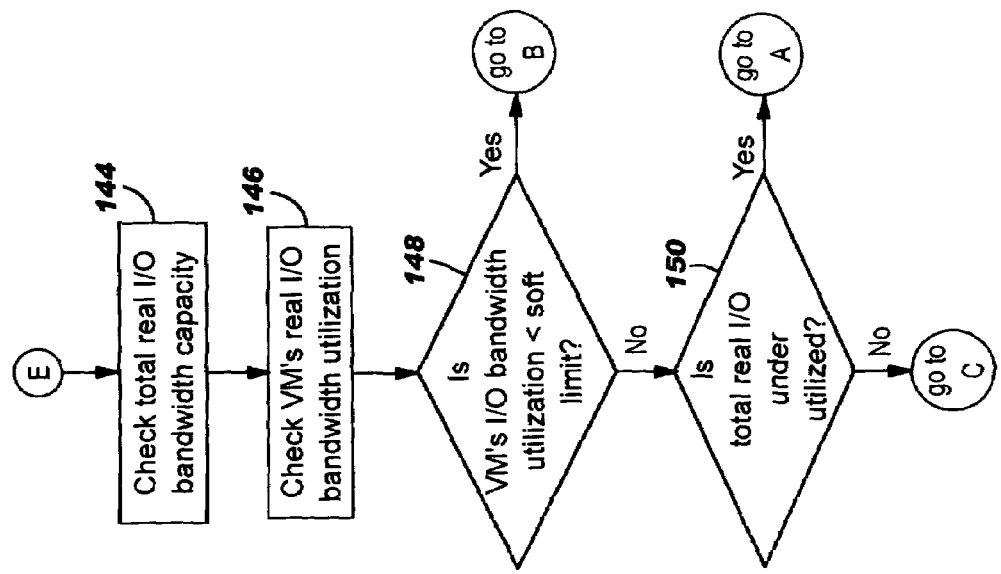

MANAGEMENT OF VIRTUAL MACHINES TO UTILIZE SHARED RESOURCES

FIELD OF THE INVENTION

The invention relates generally to computer systems, and deals more particularly with management of virtual machines to effectively allocate and utilize virtual resources.

BACKGROUND OF THE INVENTION

A virtual machine operating system is well known today, and includes a common base portion and separate user portions formed by the common base portion. In an IBM z/VM operating system, the common base portion is called the "Control Program" or "CP" and each user portion is called a "virtual machine" or "guest". A virtual machine or guest is a virtual sharing/partitioning of real resources such as real memory, CPU and I/O. Examples of I/O devices are DASD, network cards, printers and displays. A guest operating system executes/runs on each virtual machine, and one or more applications run on the guest operating system. Each application and guest operating system behave as if they are running on their own private, real computer.

Typically, each virtual machine is allocated a finite amount of resources, such as private virtual memory, real CPU and real I/O. The amounts allocated are intended to accommodate maximum needs of the virtual machine during most operating conditions. However, during operation of the virtual machine, the virtual machine has varying needs for each of these resources. During some periods, the virtual machine may be executing applications requiring complex arithmetic computations which are CPU intensive and during other periods the virtual machine may be executing applications such as data backup applications which hardly use the CPU. Likewise, during some periods the virtual machine may be executing applications such as data base searching, reading and writing applications which require much private memory and during other periods the virtual machine may be executing applications such as text editing applications which require little private memory. Likewise, during some periods the virtual machine may be executing applications such as data backup applications which require substantial I/O activity and during other periods the virtual machine may be executing applications such as arithmetic computation applications which require little I/O activity. During some of the periods of operation, the virtual machine may need more of a virtual resource than has been allocated, in which case the finite virtual resource allocation may constrain the operation of the virtual machine. During other periods of operation, the virtual machine does not utilize its full allocation of one or more virtual resources, so these virtual resources may be wasted in the sense that another virtual machine could have used the excess allocation.

The following is an example of how a known virtual machine utilizes its CPU to perform work items. Each virtual machine has its own dispatch function which consists of its synchronization or lock function, work queue assignment function, work scheduler and associated work queue of work items or tasks assigned by and to the virtual machine. The synchronization or lock function, work queue assignment function, work scheduler and the work queue are all private to the virtual machine. The synchronization or lock function manages locks for a work queue to control which work items must run sequentially and which tasks can run in parallel. A work queue assignment function is a program function within the virtual machine which adds work items to the work queue of the virtual machine when generated by the virtual machine. The work items are added to the queue at a position based on an assignment algorithm. The assignment algorithm may consider such factors as relative priority level of each work item and the order in which work items were created, i.e. first in first out. Each work item on the queue includes information indicating its type, and therefore, which function within the virtual machine is best suited to handle it. A "work scheduler" is a program function which schedules each of the work items on its queue for execution. Generally, the work scheduler removes work items from an end of the queue. The work scheduler passes the work items to the appropriate function within the virtual machine for execution by the virtual CPU. If the work items on the work queue are CPU intensive and the allocation of virtual CPU is inadequate, the work queue may grow in length as the existing work items on the queue are removed more slowly than new work items are added to the queue. In such a case, the virtual machine will fall behind in its work.

It was also known for multiple virtual machines to share a work queue to distribute the work items amongst the virtual machines and their respective shares of real CPUs. A server virtual machine was utilized for the purpose of "hosting" this shared work queue for the other, "working" virtual machines. The shared work queue resides in memory private to the server virtual machine. When a working virtual machine creates a new work item, and the work queue assignment function for this working virtual machine decides to send this new work item to the server virtual machine, it uses a communication protocol (e.g. TCP/IP) and a virtual I/O device driver to send that work item to this server virtual machine. Then, the server virtual machine places the new work item on the shared work queue in an order determined by the server virtual machine. When the virtual CPU within a working virtual machine is available to execute a work item on the shared work queue, the work scheduler within this working virtual machine uses a communication protocol and virtual I/O device driver to make that request to the server virtual machine. In response, the server virtual machine uses a communication protocol to send a work item to the working virtual machine that made the request. While this arrangement provides a shared work queue, it requires a high overhead communication protocol to both send a work item to the work queue and obtain a work item from the work queue. Furthermore, the server virtual machine attempts to balance the load among the working virtual machines by monitoring the working virtual machines and estimating which working virtual machine will be able to handle the work item most expeditiously. The server virtual machine must also be able to re-balance the load among working virtual machines when working virtual machines are dynamically added and/or deleted. Still further, the server virtual machine must synchronize the work items as determined by its private synchronization function. All these server virtual machine functions require considerable communication and "overhead" between the server virtual machine and the working virtual machines.

An object of the present invention is to provide functionality in a virtual machine operating system which helps to match the needs of the application(s) running on each virtual machine to the available resources.

Another object of the present invention is to provide functionality in a virtual machine operating system of the foregoing type which operates dynamically to help match the changing needs of the application(s) running on each virtual machine to the available resources.

Another object of the present invention is to provide functionality of the foregoing type which also considers limits set by the system administrator for resources available to the application(s) running on each virtual machine.

SUMMARY OF THE INVENTION

The invention resides in a system, computer program product and method for utilizing resources in a virtual machine operating system. The virtual machine operating system comprises a multiplicity of virtual machines. A share of resources is allocated to each of the virtual machines. Utilization by one of the virtual machines of the resources allocated to the one virtual machine is automatically monitored. If the one virtual machine needs additional resources, the one virtual machine is automatically cloned. The clone is allocated a share of the resources taken from the shares of other of the virtual machines, such that the resultant shares allocated to the one virtual machine and the clone together are greater than the share allocated to the one virtual machine before the one virtual machine was cloned.

According to one feature of the present invention, the clone performs work with its resources that would have been performed by the one virtual machine if not for the existence of said clone.

According to another feature of the present invention, the one virtual machine and the clone share a work queue, such that both the one virtual machine with its resources and the clone with its resources perform work items on the shared work queue.

BRIEF DESCRIPTION OF THE FIGURES

FIG. 1 is a block diagram of a computer system with multiple virtual machines in one state according to the present invention.

FIG. 2 is a block diagram of the computer system of FIG. 1 with multiple virtual machines in another state according to the present invention FIG. 3 is a block diagram of a synchronization or lock function that allows a virtual machine and its clone(s) to be collectively synchronized.

FIG. 4 is a flow chart illustrating the synchronization function of FIG. 3 and associated operation of the virtual machine and its clone(s).

FIGS. 5(a) and 5(b) form a flow chart illustrating operation of a resource manager within the computer system of FIG. 1 to create and delete clones of a virtual machine.

DETAILED DESCRIPTION OF THE PREFERRED EMBODIMENTS

Figure 5A:
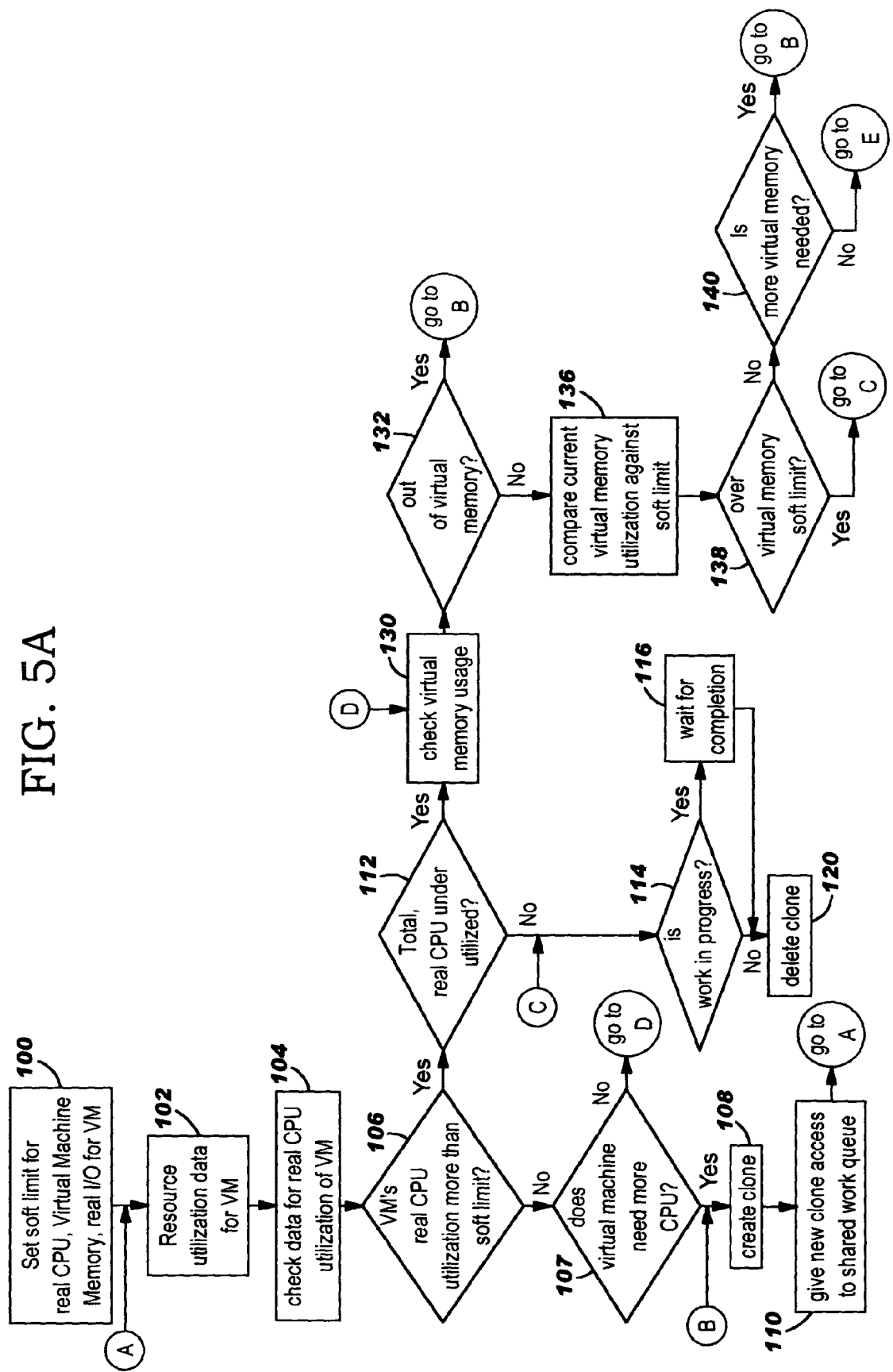

Referring now to the drawings in detail wherein like reference numbers indicate like elements throughout, FIG. 1 illustrates a computer system generally designated 10 in accordance with the present invention. Computer system 10 includes a physical computer 20 (which includes a CPU 23) and a virtual machine operating system 11. By way of example, the virtual machine operating system can be IBM z/VM version 4.2.0 or 4.3.0 modified to include the present invention. The details of z/VM 4.2.0 are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at the website of IBM selecting/shop/publications/order. This publication is hereby incorporated by reference as part of the present disclosure. Operating system 11 executes in the physical computer 10 such as an IBM zSeries mainframe although the present invention can be implemented in other server computers or personal computers as well. Operating system 11 includes a common base portion 21 (called "CP" in the z/VM operating system).

The systems administrator, during installation of the virtual machine operating system 11, defines user virtual machines 12, 14, 16 and resource manager virtual machine 17 in a directory 191. The directory 191 contains a name or identifier of each virtual machine, a "soft" limit for allocation of virtual and real resources to each virtual machine and a specification of a number of permitted clones of each virtual machine. The systems administrator can also specify in the directory 191 an initial virtual and real resource allocation for each virtual machine. In the absence of such a specification, each of the virtual machines shares equally in the total available virtual and real resources. Based on the "default" allocation, each of the virtual machines 12, 14, 16 and 17 initially has one quarter of the total virtual and real resources. In response to these definitions, common base portion 21 logically partitions the resources (including the CPU, I/O and memory) of the physical computer to form user portions 12, 14 and 16 and resource manager portion 17 (called "virtual machines" or "guests virtual machines" in the z/VM operating system). The resource manager virtual machine 17 is responsible for creating and deleting virtual machine clones, as described below. The common base portion also performs functions such as virtualizing memory, virtualizing I/O devices and virtualizing CPU.

Guest operating systems 22, 24 and 26 execute on user portions 12, 14 and 16, respectively, and applications 32, 34 and 36 execute on guest operating systems 22, 24 and 26 respectively. There may be multiple applications executing on each operating system. By way of example, guest operating systems 22 and 24 are the Linux (TM of Linus Torvalds) operating system and operating system 26 is an IBM CMS operating system. Other guest operating systems executing on user portions are also feasible such as Microsoft Windows (tm) operating system, Unix (tm) operating system, Sun Microsystems Solaris (tm) operating system or Hewlett Packard HP UX operating system. By way of example, applications 32, 34 and 36 can be IBM DB2 data base management application, IBM WebSphere application, communications applications, etc. The nature of applications 32, 34 and 36 form no part of the present invention, except that they may generate work items.

Each virtual machine has its own private memory for its private data, applications and operating system functions such as Work Queue Assignment Functions 62, 64 and 66 ("WQAFs") and work schedulers 42, 44 and 46 in user virtual machines 12, 14 and 16, respectively. Consequently, each virtual machine is afforded a measure of privacy from the other virtual partitions as in separate physical computers. The logical partition between virtual machines is also provided by the allocation of a share of real CPU, a share of real I/O and virtual private memory to each virtual machine. A share of real CPU is a time share of the total system's real CPU(s). The CPU share appears to the guest operating system as its own CPU. Likewise, a share of real I/O is a time share of the system's total real I/O capability. The I/O resources comprise the processing power devoted to I/O, e.g. "Channels" on an IBM zSeries mainframe. Virtual memory is a series of virtual addresses assigned to a virtual machine, which are translated by CP into real addresses of real memory. As explained in more detail below, each WQAF 62, 64 and 66 assigns each work item created by its own virtual machine to a proper location in its respective work queue 52, 54 or 56 in shared memory based on its assignment algorithm. Examples of work items are to read or write data, execute an application, make a request to an application, etc. The work items are initiated by a user of the application and passed via the application to the guest operating system for handling. The assignment algorithm may be based on priority level of each work item, and/or first in first out, etc. If the assignment algorithm is simply first in first out, then the WQAF assigns each new work item to the beginning of the work queue, so it is last to be removed. If the assignment algorithm is based on priority level, then the WQAF assigns each new work item to a position within the work queue before other work items of lower priority and after work items of the same priority (to prevent work items from becoming stale) or higher priority. Each WQAF also monitors and updates a status of the respective virtual machine as "idle" or "not idle" as described below. Each scheduler schedules the execution of work items from its virtual machines' work queue, and generally removes work items from the end of the work queue.

Computer 10 also includes a memory area 25 which is shared by all of the virtual machines 12, 14 and 16. Being "shared" each virtual machine can directly access the shared memory 25 and the data and data structures (including lock structures) stored in the shared memory by appropriate address, when it knows the address. The work queues 52, 54 and 56 for the WQAFs 62, 64 and 66 and respective schedulers 42, 44 and 46 are located in shared memory (even though the WQAFs and schedulers are all in the private memory of the respective virtual machines). Consequently, each WQAF can access all the work queues to add a work item to any of the work queues, when it knows the address of the work queues. In the preferred embodiment of the present invention, each WQAF is programmed to add a work item only to the work queue dedicated to its virtual machine and its clones, and each scheduler is programmed to remove work items only from the work queue dedicated to its virtual machine and its clones. Work queue 52 is dedicated to virtual machine 12 and its clones, work queue 54 is dedicated to virtual machine 14 and its clones, and work queue 56 is dedicated to virtual machine 16 and its clones.

In the state illustrated in FIG. 1, work queue 52 has three work items 70, 71 and 73 acquired from virtual machine 12 by action of WQAF 62, work queue 54 is empty, and work queue 56 has three work items 72, 74 and 76 acquired from virtual machine 16. Also in the state illustrated in FIG. 1, virtual machine 12 will acquire work item 73 from work queue 52 by action of scheduler 42, and virtual machine 16 will acquire work item 76 from work queue 56 by action of scheduler 46. A control block 58 indicates the current state, "idle" or "non idle", of the virtual machines and which, if any, of the work items from each work queue is the next to be scheduled. In the state illustrated in FIG. 1, virtual machine 12 is idle with its work queue pointer in scheduler 42 pointing to work item 73. Also in the state illustrated in FIG. 1, virtual machine 14 is idle with its work queue pointer in scheduler 44 indicating "null" because there are currently no work items in work queue 54. Also in the state illustrated in FIG. 1, virtual machine 16 is "not idle"; it is currently performing a work item previously acquired from one of the work queues. The work queue pointer of scheduler 46 within virtual machine 16 is currently indicating work item 76, so this work item has not yet been removed by scheduler 46 for execution by virtual machine 16.

After each virtual machine completes a work item or receives an interrupt, it alerts its scheduler to checks control block 58 to determine if the respective work queue contains a work item. If so, the scheduler can remove the work item indicated by the respective work queue pointer, parse it to determine the appropriate function within the virtual machine for handling, and then pass it to that function for handling. Some of the work items are CPU intensive, others are I/O device intensive and still others require substantial private memory of the virtual machine. Conversely, some of the work items require little CPU activity, others require little or no I/O activity and still others require little private memory of the virtual machine. It is often the case that work items executed during certain periods of time are virtual resource intensive and work items executed during other periods of time require little virtual resources. For example, if virtual machine 12 is executing an application that gets heavy use at a certain time of day, then virtual machine 12 may require substantial virtual resources then. Conversely, the same application may be substantially idle at another time of day and require little virtual resources then. In the state illustrated in FIG. 1, there are four virtual machines, and by default, each has been allocated twenty five percent of the total virtual resources available.

A resource monitor function 84 within the common base portion routinely monitors the utilization level of each virtual and real resource by each virtual machine and the system's total real resource utilization. Resource monitor 84 stores these levels in memory as usage records 85. The real CPU utilization of each virtual machine is measured by how much processor time each virtual machine uses when it is operated. The real I/O utilization by each virtual machine is measured by counting the number of I/O accesses and the time utilized during each such access. The virtual private memory utilization is measured by counting the number of pages referenced by a virtual machine during a time period. A resource manager function 217 within virtual machine 17 monitors the level of virtual and real resources being used by each of the user virtual machines 12, 14 and 16 by reading records 85. As described in more detail below, resource manager 217 compares these usage levels to needs by the virtual machines for virtual resources and soft limits set by the system administrator for virtual and real resources for each virtual machine.

FIG. 2 illustrates the state of computer system 10 a short time after that of FIG. 1. The following is a general explanation of how computer system 10 changed from the state of FIG. 1 to the state of FIG. 2. Between states, the resource manager 217 determined the current virtual and real resource utilization of virtual machine 12 from the usage records 85 (step 83). The virtual and real resource utilization comprises the current amount of real CPU utilization, current amount of real I/O utilization and current amount of virtual private memory utilization. In step 83, the resource manager 217 determined that virtual machine 12 was entitled to or should get more virtual and real resources than currently has, i.e. more than the (default) one quarter of the total virtual and real resources available. The need for additional virtual resources by virtual machine 12 can be based on additional need for one or more of the virtual or real resources. According to the present invention, resource manager 217 then created a single virtual machine clone 12A of virtual machine 12. (Virtual machine clone 12B was subsequently created as described below.) Resource manager 217 created virtual machine clone 12A by calling an activate function 86 within the common base portion, specifying the name or identifier of virtual machine 12 and requesting that another virtual machine identical to virtual machine 12 be created (step 87). Activate function 86 created virtual machine clone 12A by reading the directory 191 to determine the guest operating system of virtual machine 12 and the attributes of virtual machine 12, i.e. virtual and real resource allocation and operating privileges. Guest operating system 22 within virtual machine 12 includes a list of the applications currently running on virtual machine 12 and how to fetch and start a copy of them. So, when virtual machine 12A begins operating, it fetches and starts a copy 32A of application 32. With the default of equal allocation of virtual resources amongst all virtual machines, virtual machines 12 and 12A together have forty percent of the total virtual resources available, virtual machine 14 has twenty percent, virtual machine 16 has twenty percent and virtual machine 17 has twenty percent.

To collectively utilize the virtual resources of virtual machine 12 and its virtual machine clone 12A, the resource manager 212 grants to the virtual machine clone 12A access to work queue 52 (step 89). This access is "granted" by the resource manager 212 furnishing to the virtual machine clone 12A an authorization to access a portion or segment of the shared memory containing the work queue 52 of virtual machine 12. The beginning of the shared memory segment may contain the address of the shared work queue 52 and control block 58, or the resource manager can provide these addresses separately to the WQAF 62A and the scheduler 42A. The shared access by virtual machines 12 and 12A to work queue 52 also requires possession of a lock 90 described in more detail below with reference to FIGS. 3 and 4.

In one embodiment of the present invention, all the work items are created by users of application 32 on virtual machine 12 and not by users of application 32A on virtual machine 12A, i.e. no users were assigned to application 32A. In such a case, WQAF 62A does not have any work items to assign to the work queue 52. However, scheduler 42A obtains work items from the work queue 52 along with scheduler 42, so that the virtual resources of both virtual machines 12 and 12A are used to perform the work items on work queue 52. In this embodiment, clone 12A need not include a copy of application 32 if the copy is not needed to perform the work items generated by application 32 on virtual machine 12. Consider now an alternate embodiment of the present invention where the work items are created by users of application 32 on virtual machine 12 and users of application 32A on virtual machine 12A. In this case, the users of application 32A could have been reassigned from application 32 on virtual machine 12 or new users assigned to application 32A. In either case, both WQAFs 62 and 62A have work items to assign to the work queue 52, and both schedulers 42 and 42A obtain work items from the work queue 52. So, the virtual resources of both virtual machines 12 and 12A are used to perform the work items on work queue 52. (In this alternate embodiment, it is also possible to create a separate work queue for virtual machine 12A, so that virtual machine 12A does not share work queue 52.)

Virtual machine 14 and its interaction with work queue 54 remains unchanged by the creation of the virtual machine clone 12A except for the diminished virtual and real resources available to virtual machine 14 to execute the work items on work queue 54. Likewise, virtual machine 16 and its interaction with work queue 56 remains unchanged by the creation of the virtual machine clone 12A except for the diminished virtual and real resources available to virtual machine 16 to execute the work items on work queue 56.

Then, resource manager 212 repeated the foregoing analysis and determined that virtual machines 12 and 12A still have insufficient resources. So, resource manager 212 created another virtual machine clone 12B including clone application 32B. Consequently, virtual machine 12 and its virtual machine clones 12A and 12B together have fifty percent of the virtual and real resource total, virtual machine 14 has 16.7 percent of the virtual and real resource total, virtual machine 16 has 16.7 percent of the virtual and real resource total, and virtual machine 17 has 16.7 percent of the virtual and real resource total. To collectively utilize the virtual and real resources of virtual machine 12 and its virtual machine clones 12A and 12B, the resource manager 212 now grants to virtual machine clone 12B access to work queue 52 (step 89). (Virtual machine clone 12A retains its earlier granted access to work queue 52.) This access to virtual machine clone 12B is "granted" by the resource manager 212 furnishing to the virtual machine clone 12B an authorization to access a portion or segment of the shared memory containing the work queue 52 of virtual machine 12. The beginning of the shared memory segment may contain the address of the shared work queue 52 and control block 58, or the resource manager can provide these addresses separately to the WQAF 62B and the scheduler 42B. The shared access by virtual machines 12, 12A and 12B to work queue 52 also requires possession of the lock 90 described in more detail below.

In one embodiment of the present invention, all the work items are created by users of application 32 on virtual machine 12 and not by users of applications 32A or 32B on virtual machines 12A and 12B, respectively. In such a case, WQAFs 62A and 62B do not have any work items to assign to the work queue 52. However, schedulers 42A and 42B obtain work items from the work queue 52. In the state illustrated in FIG. 2, virtual machine 12 obtains and executes work item 73, virtual machine 12A obtains and executes work item 71 and virtual machine 12B obtains and executes work item 70. Thus, the virtual and real resources of all three virtual machines 12, 12A and 12B are collectively used to execute the work items on work queue 52. In an alternate embodiment of the present invention, the work items are created by users of application 32 on virtual machine 12, users of application 32A on virtual machine 12A and users of application 32B on virtual machine 12B. The users of applications 32A and 32B could have been reassigned from application 32 on virtual machine 12 or they can be new users. In such a case, WQAFs 62, 62A and 62B all have work items to assign to the work queue 52, and schedulers 42, 42A and 42B all obtain work items from the work queue 52. So, the virtual and real resources of virtual machines 12, 12A and 12B are all used to perform the work items on work queue 52. (In this alternate embodiment, it is also possible to create a separate work queue for virtual machine 12A and a separate work queue for virtual machine 12B, so that virtual machines 12A and 12B do not share work queue 52.)

Virtual machine 14 and its interaction with work queue 54 remains unchanged by the creation of the virtual machine clones 12A and 12B except for the diminished virtual and real resources available to virtual machine 14 to execute the work items on work queue 54. Likewise, virtual machine 16 and its interaction with work queue 56 remains unchanged by the creation of the virtual machine clones 12A and 12B except for the diminished virtual and real resources available to virtual machine 16 to execute the work items on work queue 56.

Other distributions of the virtual and real resources are available depending on which virtual machines are cloned, and how many clones are created. The resource manager periodically determines the virtual and real resource utilization of the virtual machines, and the need to create or delete a clone.

FIG. 3 figuratively illustrates a synchronization or lock structure generally designated 90 within the shared memory 25 of computer system 10. A lock is required for any work queue which is shared by more than one virtual machine. This will be the case when a virtual machine has one or more clones which share a work queue, such as work queue 52 shared by virtual machines 12, 12A and 12B illustrated in FIG. 2. When there are no clones for a virtual machine, then the lock structure can be bypassed or the virtual machine can continuously hold the lock. (FIG. 3 does not illustrate virtual machines 14 or 16 or their work queues 54 or 56, respectively.) In the illustrated example, virtual machine 12A holds lock 91, virtual machine 12 has a place holder 92 waiting for the lock from virtual machine 12A, and virtual machine 12B has a place holder 93 waiting for the lock from virtual machine 12. This is actually recorded in control block 58 which indicates that virtual machine 12A holds the lock and virtual machines 12 and 12B are currently waiting for the lock. The "waiter list" 95 of control block 58 indicates the order of the waiters, i.e. virtual machine 12 is first in line waiting for the lock and virtual machine 12B will attempt to obtain the lock after virtual machine 12 obtains the lock. In the example, virtual machine 12A holds lock 91 exclusively, that is, no other virtual machine may concurrently hold this lock. Virtual machine 12 and 12B are waiting for the lock and willing to hold the lock shared, that is, they may concurrently hold the lock with each other.

FIG. 4 illustrates each of the synchronization or lock functions 562, 562A and 562B within virtual machines 12, 12A and 12B, respectively, and associated operation of each of the virtual machines that is trying to obtain the lock for the shared work queue 52 in shared memory. In the following example, a virtual machine (such as virtual machine 12B) requests a lock for the shared work queue 52 (step 700). If the virtual machine just wants to read the shared work queue, then the virtual machine need only request a shared lock. However, if the virtual machine wants to remove a work item from the shared work queue (which is more typically the case), then the virtual machine will request an exclusive lock. Typically, the virtual machine will want to remove a work item from the work queue, so will request an exclusive lock for this objective and decision 702 leads to decision 704. In decision 704, the synchronization function determines if the requested lock is currently held by another virtual machine (either in a shared or exclusive manner). If so, the exclusive lock is not available to the current requester, and synchronization function updates the control block to indicate that the requesting virtual machine is idle and "waiting" for the exclusive lock (step 706). Also, the virtual machine enters a waiting/quiescent state (step 708) where it waits for an interrupt (decision 710). Referring again to decision 704, if the requested lock is not currently held by anyone, then the synchronization function marks the virtual machine as "not idle" (step 712) and grants the lock to the virtual machine (step 714). This granting of the lock is accomplished by corresponding update to control block 58. Next, the virtual machine removes the next work item from the shared work queue 52 and performs the task indicated by the work item (step 716). Afterwards, the virtual machine notifies the synchronization function that it has performed the work item, and it is "releasing" the lock (step 718). In response, the synchronization function updates the control block 58 to indicate that the lock has been released. Also, the synchronization function determines from the control block 58 if any other virtual machine is currently waiting for the lock (decision 720). If not, the processing of the synchronization function is complete (step 722). If so, the synchronization function determines from the control block 58 if the first virtual machine marked "waiting" is "idle" (decision 724). If not, the processing of the synchronization function is complete (step 722) because it would be too disruptive of the non idle, waiting virtual machine to be interrupted at this time. Instead, when the non idle, waiting virtual machine completes its current work item or at some other time that is convenient for the waiting virtual machine, it will likely request the lock on its own at step 700. Referring again to decision 724, if the waiting virtual machine is idle, then the synchronization function issues an interrupt to the waiting virtual machine (step 728). This will not be wasteful to the waiting virtual machine because it is idle anyway. After receiving the interrupt, the idle virtual machine will awaken and can request the lock at step 700.

Referring back again to decision 702, if the lock requested by the virtual machine is shared and not exclusive, such as to read the shared work queue, then the synchronization function determines if the lock is currently being held in an exclusive manner (decision 740). If not (i.e. no lock is currently being held or only a shared lock is currently being held), then the synchronization function proceeds to step 712 and continues as described above. However, if the lock is currently being held in an exclusive manner, then the synchronization function marks in the control block 58 that the requesting virtual machine as "idle" and "waiting" for a shared lock (step 742). Then, the requesting virtual machine enters into a waiting/quiescent state (step 744), waiting for an interrupt (decision 748). Upon receipt of such an interrupt, it can proceed to step 700 to request the lock.

FIGS. 5(a) and 5(b) illustrate the foregoing operation of resource manager 217 in more detail. The resource manager 217 performs the steps of FIGS. 5(a) and 5(b) for each user virtual machine 12, 14 and 16 to determine the need to create a clone of the virtual machine or delete a clone of the virtual machine. Initially, the resource manager 217 sets new soft limits for the real CPU, the virtual private memory and the real I/O allocated to the virtual machine or reads the original ones from the directory 191 if available there (step 100). The real CPU allocation for a virtual machine is the amount of CPU processing time available to the virtual machine. The virtual private memory is the amount of private memory allocated to the virtual machine; the addresses assigned for this private memory are mapped to the real memory. The real I/O is the amount of real I/O bandwidth available to the virtual machine. Next, the resource manager fetches from the usage records 85 the current utilization levels of the foregoing resources by the virtual machines (step 102). As noted above, the common base portion periodically monitors these virtual and real utilization levels for the resources. Then, the resource manager reads the real CPU utilization level of the virtual machine (step 104). Next, the resource manager determines if the current real CPU utilization by the virtual machine is more than its soft limit (decision 106). If not, then the resource manager determines if the virtual machine needs additional virtual resources (decision 107). This determination is made by monitoring the workload of the virtual machine each time it has a time slice of the real CPU. If the virtual machine usually or always has outstanding work to complete when it has access to the real CPU, then it probably needs a greater share of the real CPU. If so, then the resource manager creates a clone of the virtual machine in the manner described above (step 108). Also, the resource manager gives the clone access to the shared work queue in the manner described above (step 110).

Referring again to decision 106, if the current real CPU utilization level of the virtual machine is equal or more than the soft limit, then the resource manager determines if the total, real CPU for the system is under utilized (decision 112). If not, then it is likely that one or more other virtual machines are "starved" for the CPU and it is fair to give additional real CPU resource to the other virtual machines and take some back from the virtual machine currently under review. So the resource manager will proceed to delete a clone of the virtual machine as follows. The resource manager determines if the virtual machine (currently under review) is currently performing a work item (decision 114). If so, the resource manager waits for the virtual machine to complete its current work item (step 116). If not or after the resource manager completes its current work item, the resource manager deletes a clone of the virtual machine, assuming one exists (step 120).

Referring again to decision 112, if the total, real CPU for the system is under utilized, then it is not necessary to delete a clone of the virtual machine; the other virtual machines should not be starved. However, it may be necessary to delete a clone to free up other real or virtual resources. So, the resource manager checks the virtual, private-memory utilization of the virtual machine (step 130). (Referring again to decision 107, if the virtual machine does not need real CPU, then the resource manager also proceeds to step 130.) If the virtual private-memory utilization of the virtual machine is one hundred percent of the allocation (decision 132), then the resource manager proceeds to step 108 as described above to create a clone of the virtual machine. However, if the virtual private-memory utilization is less than one hundred percent, then the resource manager compares the utilization level to the soft limit for virtual private memory (decision 136). If the current, virtual, private-memory utilization is over the soft limit (decision 138), then the resource manager proceeds to decision 114 and then to step 120 as described above to delete a clone of the virtual machine, if one currently exists. Referring again to decision 136, if the current virtual private-memory utilization is not over the soft limit, then the resource manager determines if the virtual machine needs additional private virtual memory (step 140). This determination is made by monitoring the amount of paging required for this virtual machine. "Paging" occurs when a virtual machine has inadequate virtual private memory and must write its excess data out to disk storage. If the virtual machine needs additional private memory, then the resource manager proceeds to step 108 to create a clone. If not, then the resource manager checks the total, real I/O bandwidth for the system (step 144). Then, the resource manager checks the current real I/O utilization by the virtual machine (step 146). If the current real I/O utilization by the virtual machine is less than the soft limit (decision 148), then the resource manager proceeds to step 108 to create a clone. If not, the resource manager determines if the total, real I/O for the system is under utilized (decision 150). If not, then the resource manager proceeds to decision 114 and step 120 to delete a clone, if one exists. If so, then the resource manager loops back to step 100 to repeat the foregoing process.

Based on the foregoing, a computer system embodying the present invention has been disclosed. However, numerous modifications and substitutions can be made without deviating from the scope of the present invention. For example, logical partitions could be substituted for the virtual machines. Also, other virtual resource allocation techniques can be combined with the foregoing techniques. For example, a human systems administrator acting through the common base portion can manually change the virtual resource allocation to each virtual machine and the respective soft limits for such virtual machines, including the clones. After such a change, the resource manager would use the new allocations and soft limits to determine when to add or delete a clone. Therefore, the present invention has been disclosed by way of illustration and not limitation, and reference should be made to the following claims to determine the scope of the present invention.

The invention claimed is:

1. A process for utilizing resources by a virtual machine operating system, said virtual machine operating system defining a multiplicity of virtual machines, a share of resources being allocated to each of said virtual machines, said process comprising the steps of:
   automatically monitoring utilization by one of said virtual machines of the resources allocated to said one virtual machine, and
   determining that said one virtual machine needs additional resources to effectively perform work items on a work queue, and in response, automatically cloning said one virtual machine, said clone being allocated a share of said resources taken from the shares of other of said virtual machines, such that the resultant shares allocated to said one virtual machine and the clone of said one virtual machine together are greater than the share allocated to said one virtual machine before said one virtual machine was cloned; and
   wherein said one virtual machine and said clone share said work queue, such that both said one virtual machine with its resources and said clone with its resources perform said work items on said shared work queue.

2. A process as set forth in claim 1 wherein said shared work queue resides in a memory shared by said one virtual machine and said clone.

3. A process as set forth in claim 2 wherein both said one virtual machine and said clone can directly access said shared work queue by appropriate address.

4. A process as set forth in claim 2 further comprising a lock in said shared memory for said shared work queue, and wherein said one virtual machine and said clone obtain said lock before accessing said shared work queue.

5. A process as set forth in claim 4 wherein both said one virtual machine and said clone can directly access said lock by appropriate address.

6. A process for utilizing resources by a virtual machine operating system, said virtual machine operating system defining a multiplicity of virtual machines, a share of resources being allocated to each of said virtual machines, said process comprising the steps of:
   automatically monitoring utilization by one of said virtual machines of the resources allocated to said one virtual machine, and
   determining that said one virtual machine needs additional resources to effectively perform work requests from a user of said one virtual machine, and in response, automatically cloning said one virtual machine, said clone being allocated a share of said resources taken from the shares of other of said virtual machines, such that the resultant shares allocated to said one virtual machine and the clone of said one virtual machine together are greater than the share allocated to said one virtual machine before said one virtual machine was cloned; and wherein said one virtual machine includes an application which receives some of said work requests from said user of said one virtual machine, said clone includes a copy of said application, and said clone uses said copy of said application to perform other of said work requests made by said user of said one virtual machine.

7. A computer system comprising:

a processor;

a multiplicity of virtual machines, a share of resources including a share of said processor being allocated to each of said virtual machines;

means for monitoring utilization by one of said virtual machines of the resources allocated to said one virtual machines, and means, responsive to said one virtual machine needing additional resources to effectively perform work items on a work queue, for automatically cloning said one virtual machine, said clone being allocated a share of said resources taken from the shares of other of said virtual machines, such that the resultant shares allocated to said one virtual machine and the clone of said one virtual machine together are greater than the share allocated to said one virtual machine before said one virtual machine was cloned; and wherein said one virtual machine and said clone share said work queue, such that both said one virtual machine with its resources and said clone with its resources perform said work items on said shared work queue.

8. A computer system as set forth in claim 7 wherein said shared work queue resides in a memory shared by said one virtual machine and said clone.

* * * * *